US011574172B2

(12) United States Patent
Sengupta et al.

(10) Patent No.: US 11,574,172 B2
(45) Date of Patent: Feb. 7, 2023

(54) TECHNOLOGIES FOR PERFORMING EFFICIENT MEMORY AUGMENTED NEURAL NETWORK UPDATE OPERATIONS

(71) Applicant: Intel Corporation, Santa Clara, CA (US)

(72) Inventors: Dipanjan Sengupta, Hillsboro, OR (US); Jawad B. Khan, Portland, OR (US); Theodore Willke, Tacoma, WA (US); Richard Coulson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 992 days.

(21) Appl. No.: 16/361,432

(22) Filed: Mar. 22, 2019

(65) Prior Publication Data

US 2019/0220735 A1    Jul. 18, 2019

(51) Int. Cl.
*G06N 3/063* (2006.01)
*G06F 3/06* (2006.01)
*G06N 3/04* (2006.01)

(52) U.S. Cl.
CPC ........... *G06N 3/063* (2013.01); *G06F 3/0604* (2013.01); *G06F 3/0659* (2013.01); *G06F 3/0673* (2013.01); *G06N 3/0472* (2013.01)

(58) Field of Classification Search
None
See application file for complete search history.

(56) References Cited

U.S. PATENT DOCUMENTS

2019/0220202 A1*   7/2019   Khan ................... G06F 3/0659

OTHER PUBLICATIONS

Extended European search report for European patent application No. 20161580.4, dated Aug. 4, 2020 (8 pages).
Jack W Rae et al, "Scaling Memory-Augmented Neural Networks with Sparse Reads and Writes", Oct. 27, 2016 (Oct. 27, 2016), pp. 1-17, G06N3/08, XP055350728, URL:https://arxiv.org/pdf/1610.09027.pdf [retrieved on Mar. 1, 2017].
Seongsik Park et al: "Quantized Memory-Augmented Neural Networks", arxiv.org, Cornell University Library, 201 Olin Library Cornell University Ithaca, NY 14853, Nov. 10, 2017 (Nov. 10, 2017), XP080836027.

* cited by examiner

*Primary Examiner* — Ernest Unelus
*Assistant Examiner* — Dayton Lewis-Taylor
(74) *Attorney, Agent, or Firm* — Jordan IP Law, LLC

(57) ABSTRACT

Technologies for efficiently performing memory augmented neural network (MANN) update operations includes a device with circuitry configured to obtain a key usable to search a memory associated with a memory augmented neural network for one or more data sets. The circuitry is also configured to perform a stochastic associative search to identify a group of data sets within the memory that satisfy the key and write to the identified group of data sets concurrently to update the memory augmented neural network.

20 Claims, 8 Drawing Sheets

Scatter gather template may apply to a three dimensional stack of data units.

Scatter gather result from a defined template. Data units with a rectangular border are to be accessed.

Scatter gather template.

TECHNOLOGIES FOR PERFORMING EFFICIENT MEMORY AUGMENTED NEURAL NETWORK UPDATE OPERATIONS

BACKGROUND

Currently, there is a significant focus on how to add long term memory to neural networks. One approach is using Memory Augmented Neural Networks (MANNs), such as Neural Turing Machines and Differential Neural Computers, which are based on differentiable trainable memory, in which the memory is separated from the neural network. The associative memory for MANNs is considered a "soft memory" and utilizing a MANN is not simple and is not at all like traditional memory access. In such systems, the memory is addressed by keys and is probabilistic and "blurred." If the desired key on a read operation matches one key 80%, and another key 20%, the read operation will return 80% of the first value combined with 20% of the second value. For writes, the degree of key match determines how "strong" the write is. For example, for an 80% match, then the new value will be 20% of the old value combined with 80% of the new value. In operation, to update data in a MANN, a compute device may locate a set of k data sets (e.g., rows) that most closely match a reference data set (e.g., a key) and assign a weight value to each of the k data sets based on the degree of similarity (higher value for closest match), by iteratively comparing each data set to the reference data set. Subsequently, a typical system will iteratively write updated data to particular parts of the k most closely matching data sets using their respective weight values. Performing the above operations is time and compute intensive and presents a bottleneck to the ability to efficiently utilize MANNs (e.g., for artificial intelligence applications).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
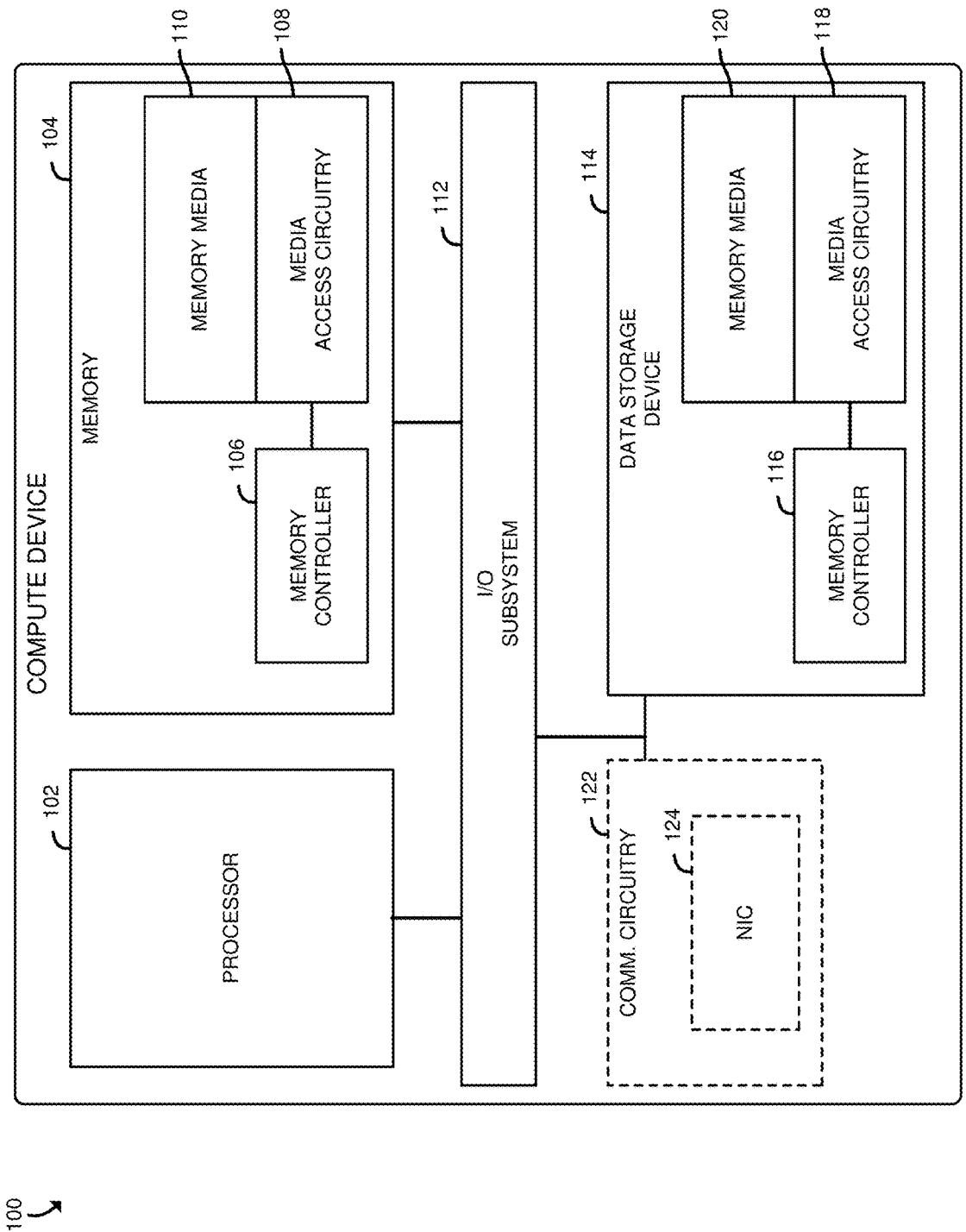
FIG. 1 is a simplified diagram of at least one embodiment of a compute device for performing efficient memory augmented neural network (MANN) update operations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for performing efficient memory augmented neural network (MANN) updates includes a processor 102, memory 104, an input/output (I/O) subsystem 112, a data storage device 114, and communication circuitry 122. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. As described herein, the compute device 100, and in particular, the memory 104 of the compute device 100 enables efficient MANN update operations by performing a combination of stochastic associative searches (e.g., searching for inexact matches to a reference data set, referred to herein as a key) and scatter-gather operations to read from and/or write to rows and columns of memory based on templates (e.g., defined sets of memory locations, defined by rows and columns, that may be non-contiguous). In particular, a memory controller 106 of the memory 104 may perform a stochastic associative search to identify a set of nearest neighbors (the rows having the highest number of matching bits (the lowest Hamming distance)) from the key and perform a scatter (e.g., a write to particular column and row combinations, referred to as tiles, within those resulting closest matches) in a single operation. As a result, the compute device 100 may increase the speed at which MANN update operations are performed (e.g., updated with new data) by an order of magnitude as compared to conventional systems.

The processor 102 may be embodied as any device or circuitry (e.g., a multi-core processor(s), a microcontroller, or other processor or processing/controlling circuit) capable of executing a workload (e.g., a set of operations, such as an application that may produce requests to read from and/or write to memory locations, such as non-contiguous memory locations) and/or performing other operations described herein. In some embodiments, the processor 102 may be embodied as, include, or be coupled to an FPGA, an application specific integrated circuit (ASIC), reconfigurable hardware or hardware circuitry, or other specialized hardware to facilitate performance of the functions described herein.

Figure 2:
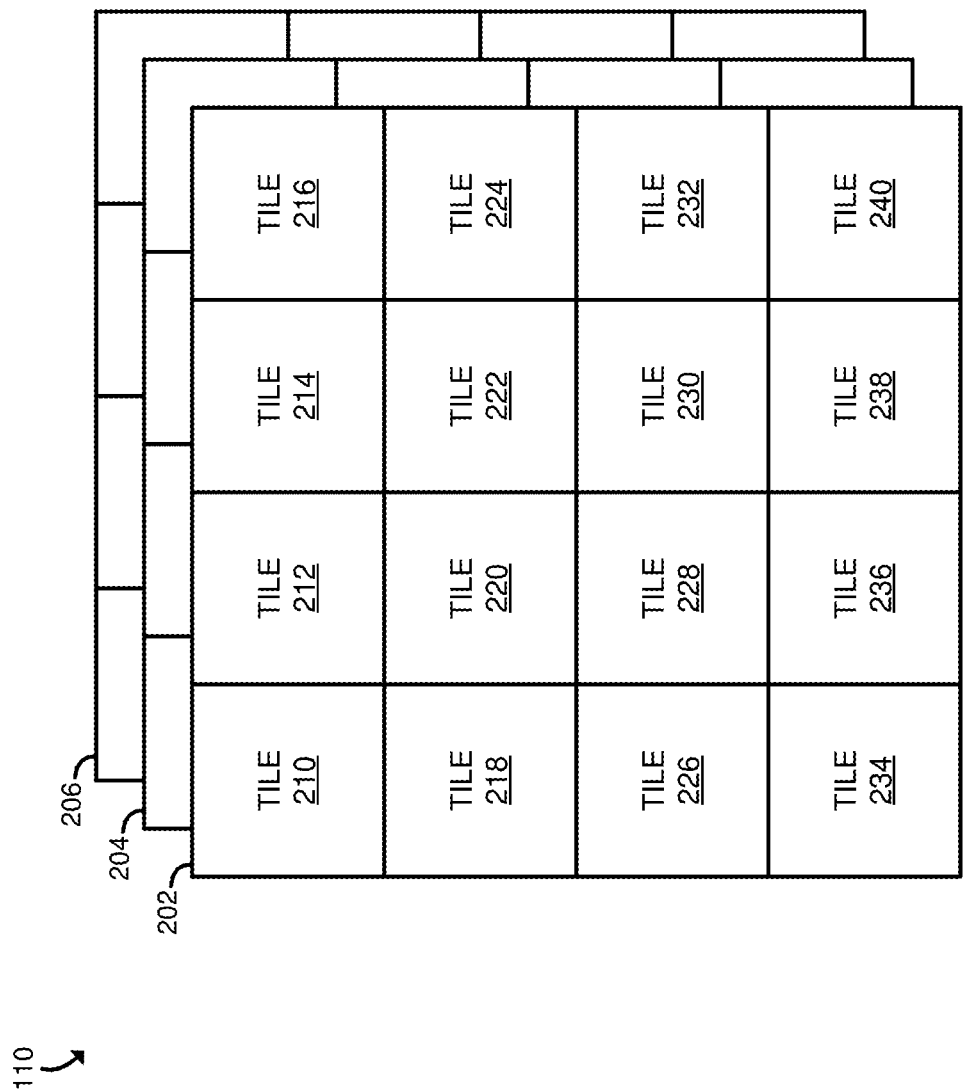
FIG. 2 is a simplified diagram of at least one embodiment of a memory media included in the compute device of FIG. 1.

The memory 104, which may include a non-volatile memory (e.g., a far memory in a two-level memory scheme), includes a memory media 110 and media access circuitry 108 (e.g., a device or circuitry, such as integrated circuitry constructed from complementary metal-oxide-semiconductors (CMOS) or other materials) underneath the memory media 110. The media access circuitry 108 is also connected to a memory controller 106, which may be embodied as any device or circuitry (e.g., a processor, a co-processor, dedicated circuitry, etc.) configured to selectively read from and/or write to the memory media 110 (e.g., in response to requests from the processor 102, which may be executing an application seeking to read from or write to the memory media 110). Referring briefly to FIG. 2, the memory media 110, in the illustrative embodiment, includes a set of tiles 210, 212, 214, 216, 218, 220, 222, 224, 226, 228, 230, 232, 234, 236, 238, 240 (e.g., each an addressable section of the memory media 110 capable of retaining data) arranged in a cross point architecture (e.g., an architecture in which memory cells sit at the intersection of word lines and bit lines and are individually addressable and in which bit storage is based on a change in bulk resistance), in which each tile is addressable by an x parameter and a y parameter (e.g., a column and a row). A set of tiles form a partition and multiple partitions may be stacked as layers 202, 204, 206 to form a three-dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

In the illustrative embodiment, an application executed by the processor 102 of the compute device may define a set of non-contiguous addresses (e.g., x and y coordinates, wherein each x and y (e.g., column and row) coordinate combination corresponds to a tile or a set of tiles (extending up a stack of partitions, in a z direction)), referred to herein as a template. In the illustrative embodiment, the application (e.g., the processor 102 executing the application) may send a request to the memory controller 106 to define a given template, and in response the memory controller 106 may store the template (e.g., a series of addresses of memory locations) in association with an identifier for the template (e.g., an index number). Subsequently, the memory controller 106 may, in a single write operation (rather than a sequence of write operations), write a set of data to the memory locations identified in the template (e.g., in response to a scatter request, from the application, that includes the data to be written and the reference to the template). Similarly, the memory controller 106 may, in a single read operation (rather than a sequence of read operations), read a set of data from the memory locations identified in the template (e.g., in response to a gather request, from the application, that identifies the template). In some embodiments, multiple data units, such as multiple bits, are associated with a given column and row pair (e.g., because the memory media 110 contains a stack of layers 202, 204, 206).

Furthermore, using the ability to address (e.g., read the values of) each column individually, the memory controller 106 may perform a stochastic associative search in which the memory controller 106 identifies a row that most closely matches (e.g., an inexact match) a reference data set (e.g., a reference data set received from an application executed on the compute device 100). In identifying the closest match, the memory controller may determine which row in a set of rows to be compared to the reference data set, has the greatest number of matching values to the reference data set (e.g., the reference data set has a 1 as the first bit, and the row also contains a 1 as the first bit, the reference data set has a 0 as the second bit and the row also contains a 0 as the second bit, etc.). In doing so, rather than comparing the entire reference data set to the entirety of the column values for each row in the set of rows to be searched, the memory controller 106 compares only a subset of the column values to the reference data set. In performing the search, the memory controller may perform a stochastic search on sparse data (e.g., only 10% of the bits are set to a reference value, such as 1 or 0), a stochastic search on dense data (e.g., 50% of the bits are 1 and 50% of the bits are 0), or a field search within a vector (e.g., a specific section of a larger data structure). As such, the memory 104 provides functionality similar to that of a content addressable memory (CAM), but at a much lower cost than the CAM (due to differences in manufacturing costs) and, unlike a content addressable memory, provides the ability to identify a closest match, rather than only being able to identify an exact match. The ability to identify the closest inexact match is a key feature to enable machine learning operations (e.g., in a memory augmented neural network).

The memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a crosspoint architecture that enables bit-level addressability (e.g., the ability to read from and/or write to individual bits of data, rather than bytes or other larger units of data), and are illustratively embodied as three-dimensional (3D) crosspoint memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114, may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, media access circuitry 118, similar to the media access circuitry 108, and memory media 120, similar to the memory media 110. As such, in the illustrative embodiment, the data storage device 114 (e.g., the memory controller 116) is capable of efficiently performing MANN update operations on the memory media 120. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 122 includes a network interface controller (NIC) 122, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

Figure 3:
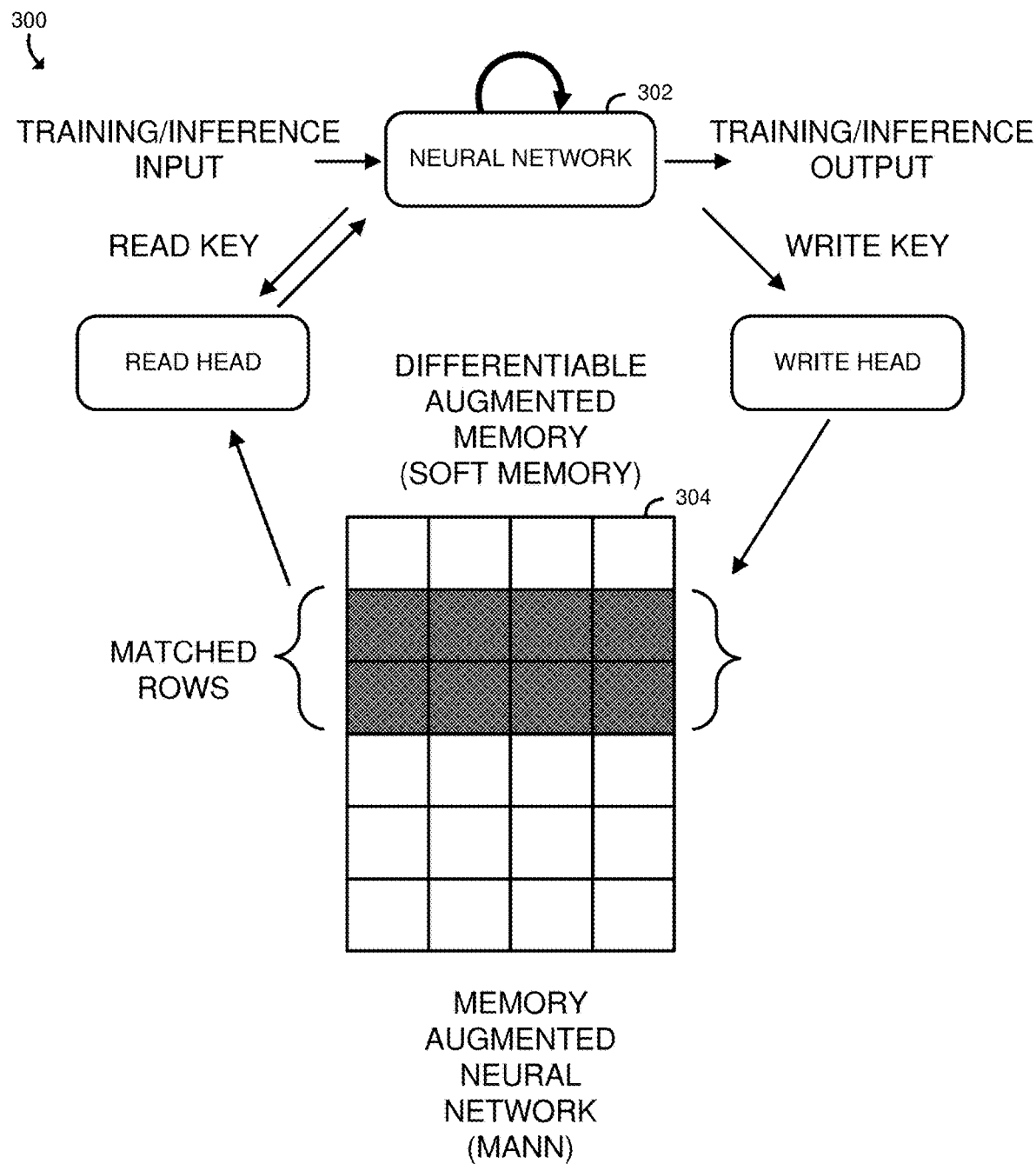
FIG. 3 is a simplified diagram of at least one embodiment of a memory augmented neural network (MANN) that may be implemented by the compute device of FIG. 1.

Referring briefly to FIG. 3, the compute device 100 may implement (e.g., execute) a memory augmented neural network (MANN) 300. The MANN 300 includes a neural network 302 which may be embodied as a framework for machine learning algorithms to work together to process complex data inputs. In the illustrative embodiment, the neural network 302 may learn to perform tasks based on examples, without being programmed with task-specific rules. For example, in image recognition, the neural network 302 may learn to identify images that contain a particular type of object (e.g., a dog) by analyzing example images that have been manually labeled as "dog" or "no dog" and using the results to identify dogs. The neural network 302, in the illustrative embodiment, is based on a collection of connected units or nodes, referred to as artificial neurons, which model the neurons in a biological brain. Each connection may transmit a signal from one artificial neuron to another. The signal at a connection between artificial neurons may be embodied as a real number and the output of each artificial neuron is computed by a function (e.g., a non-linear function) as the sum of its inputs. The neural network 302 learns by selectively adjusting weights applied to the artificial neurons and/or the connections between artificial neurons to selectively increase the strength of a signal at a connection. The adjustments to the weights may be based on an error (e.g., a difference) between a determination (e.g., an inference as to the type of object represented in an image) made by the neural network 302 and reference data (e.g., data indicative of the actual type of object represented in the image). In some embodiments, the artificial neurons may be organized into layers and each layer may be responsible for performing a particular type of transformation on input received at that layer. As shown, in operation, a differentiable augmented memory 304 (e.g., the memory media 110, 120) is written to and read from during the operation of the neural network 302 using keys (e.g., each a reference data set) to select (e.g., match) rows (e.g., data sets in a group of data sets that most closely match the key) to be accessed. In the illustrative embodiment, the memory 304 is a soft memory (e.g., an associative memory in which a given data set may represent multiple values that are blurred (e.g., combined) together, simultaneously representing a percentage of one value, another percentage of another value, etc.). Further, and as described herein, due to the column and row addressability of the underlying memory media 110, 120, the columns and rows need not be contiguous and may be accessed concurrently, rather than iteratively, enabling updates to the MANN 300 to be performed more efficiently (e.g., in terms of time and energy consumption) than in conventional systems.

Figure 4:
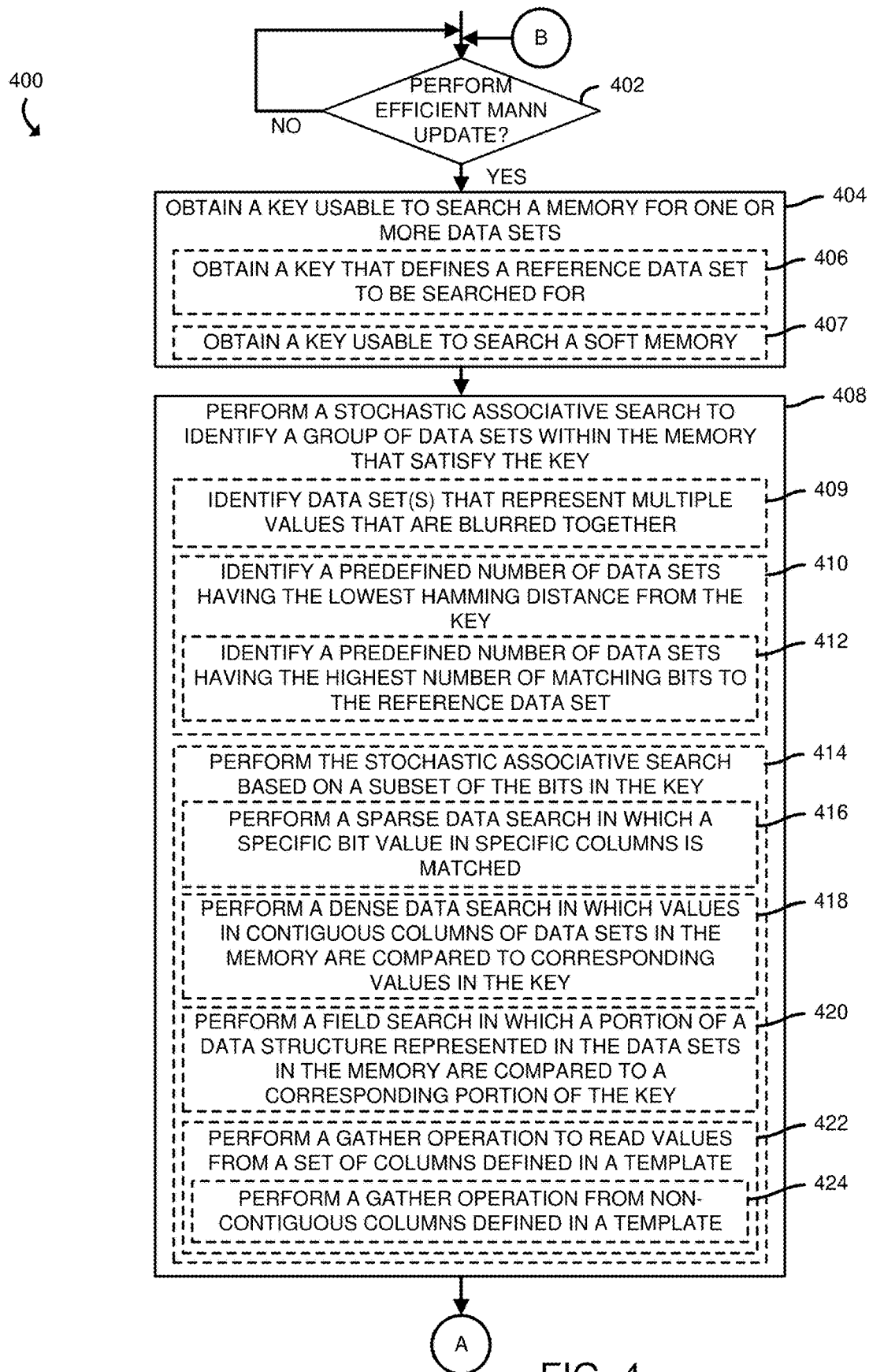
FIGS. 4-5 are a simplified diagram of at least one embodiment of a method for performing efficient memory augmented neural network (MANN) update operations that may be performed by the compute device of FIG. 1.

Referring now to FIG. 4, the compute device 100, in operation, may execute a method 400 for performing efficient memory augmented neural network (MANN) update operations. The method 400 is described with reference to the memory 104. However, it should be understood that the method 400 could be additionally or alternatively performed using the memory of the data storage device 114. The method 400 begins with block 402 in which the compute device 100 determines whether to enable efficient MANN update operations (e.g., whether to perform the operations of the method 400). In making the determination, the compute device 100 may determine whether the memory media 110 supports row and column addressability, whether the compute device 100 is configured to implement (e.g., execute) a MANN 300 (e.g., as part of an artificial intelligence workload, such as an image recognition application), and whether the memory controller 106 has been requested to update the MANN 300 (e.g., write to a portion of the differentiable augmented memory 304, which may be embodied as the memory media 110). In other embodiments, the compute device 100 may make the determination based on other factors. Regardless, in response to a determination to enable efficient MANN update operations, the method 400 advances to block 404 in which the compute device 100 (e.g., the memory controller 106) obtains a key (e.g., from an application executed by the processor 102 executing an artificial intelligence related workload) usable to search the memory (e.g., the memory media 110) for one or more data sets. As indicated in block 406 the compute device 100 (e.g., the memory controller 106) obtains a key that defines a reference data set to be searched for (e.g., to find data sets in the memory that are related to data represented in the key). Further, and as indicated in block 407, in obtaining a key, the compute device 100 (e.g., the memory controller 106), in the illustrative embodiment, obtains a key that is usable to search a soft memory (e.g., an associative memory in which a data set that matches a key could represent multiple values that are blurred (e.g., combined) together, such as 80% of one value and 20% of another value).

Subsequently, in block 408, the compute device 100 (e.g., the memory controller 106) performs a stochastic associative search to identify a group of data sets within the memory 104 that satisfy the key. In doing so, and as indicated in block 409, the compute device 100 (e.g., the memory controller 106), in the illustrative embodiment, identifies one or more data sets that represent multiple values blurred together (e.g., a given data set concurrently represents a percentage of one value and another percentage of another value). As indicated in block 410, the compute device 100 (e.g., the memory controller 106) may identify a predefined number of data sets (e.g., two data sets) having the lowest Hamming distance from the key. As indicated in block 412, the compute device 100 (e.g., the memory controller 106) may identify a predefined number of data sets having the highest number of matching bits to the reference data set defined by the key. In performing the stochastic associative search, the compute device 100 (e.g., the memory controller 106) may perform the stochastic associative search based on a subset of (e.g., less than all of) the bits in the key (e.g., in the reference data set defined by the key), as indicated in block 414. For example, and as indicated in block 416, the compute device 100 (e.g., the memory controller 106) may perform a sparse data search in which the specific bit values in specific columns (e.g., non-contiguous columns) from the data sets (e.g., rows) in the memory 104 are compared to corresponding values (e.g., values at specific columns) in the key (e.g., in the reference data set defined by the key). Alternatively, and as indicated in block 418, the compute device 100 (e.g., the memory controller 106) may perform a dense data search in which values in contiguous columns of the data sets (e.g., rows) in the memory 104 are compared to corresponding values in the key (e.g., values at corresponding positions in the reference data set defined by the key). As indicated in block 420, the compute device 100 (e.g., the memory controller 106) may perform a field search in which a portion of a data structure represented in the data sets in the memory 104 are compared to a corresponding portion of the key (e.g., of the reference data set defined by the key).

Figure 6:
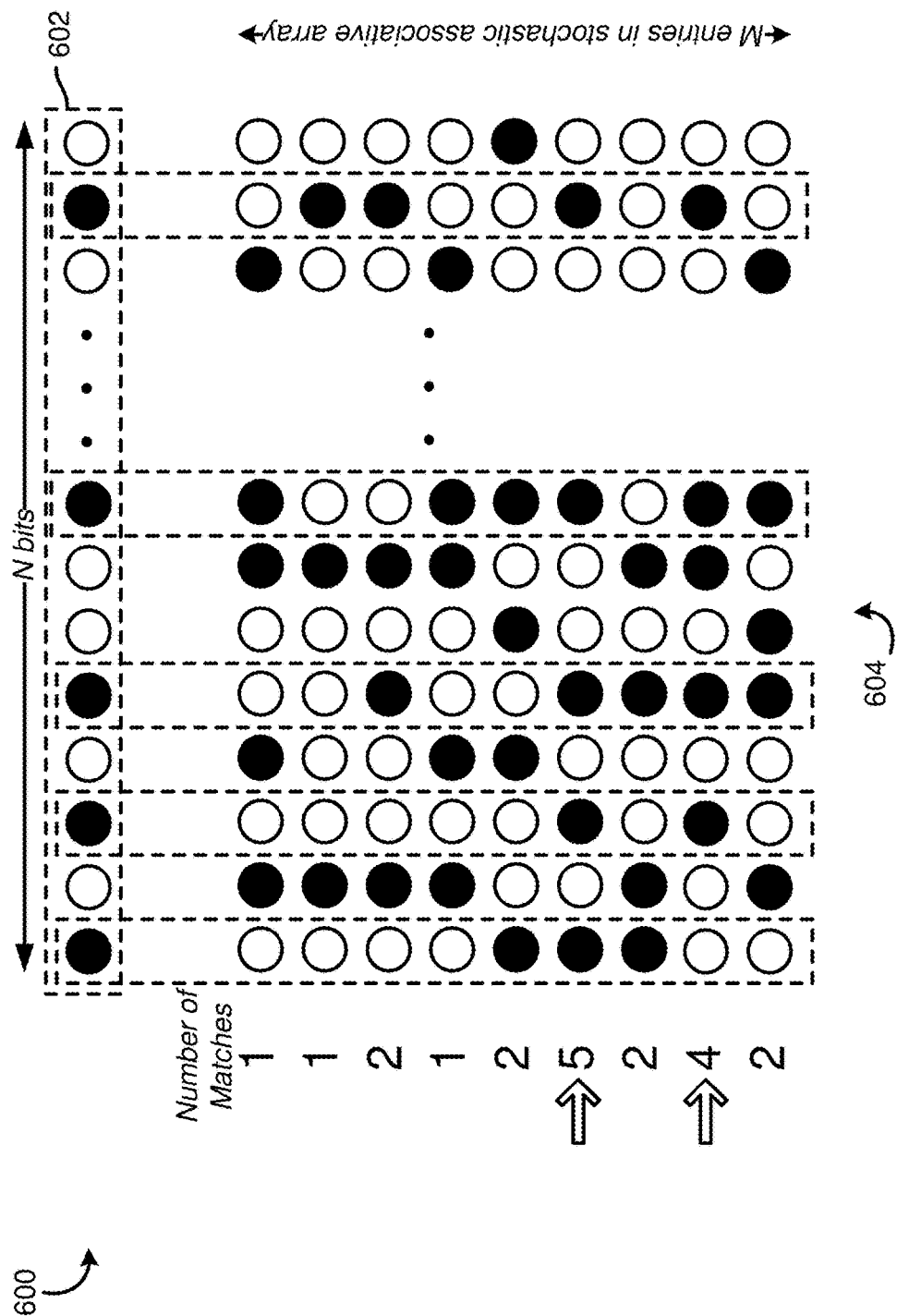
FIGS. 6 and 7 are simplified conceptual diagrams of examples of performing a stochastic associative search on memory.

Referring briefly to FIG. 6, a conceptual diagram of an example 600 of performing a stochastic associative search on memory is shown. In this example 600, assume that data is distributed sparsely (e.g., less than 10% of the values are equal to a predefined value, such as one or zero). Illustratively, a search key 602 expands to N bits, which is the same length of the rows in the matrix 604. The matrix 604 also includes M entries as part of a stochastic associative array.

The search key 602 is indicative of a reference data set having set bits in particular positions therein, represented in FIG. 6 as filled dots. In this example 600, because the matrix is representative of a sparse matrix, the compute device 100 searches only the columns of the matrix 604 that correspond to positions in the search key 602 having set bits, as indicated by the dotted rectangles running vertical down from the search key 602. Doing so reduces the amount of time spent by the compute device 100 performing a stochastic associative search operation on the data set because the compute device 100 does not evaluate every column of the matrix 604. The compute device 100 may maintain a counter to associate with each row that is indicative of a number of matches in column indices associated with the row to the search key 602. In this case, the compute device 100 identifies, in the sparse matrix 604, two matrices as candidate data sets (indicated by the one-way arrows pointing to the rows). The two candidate data sets are associated with five matches and four matches.

Figure 7:
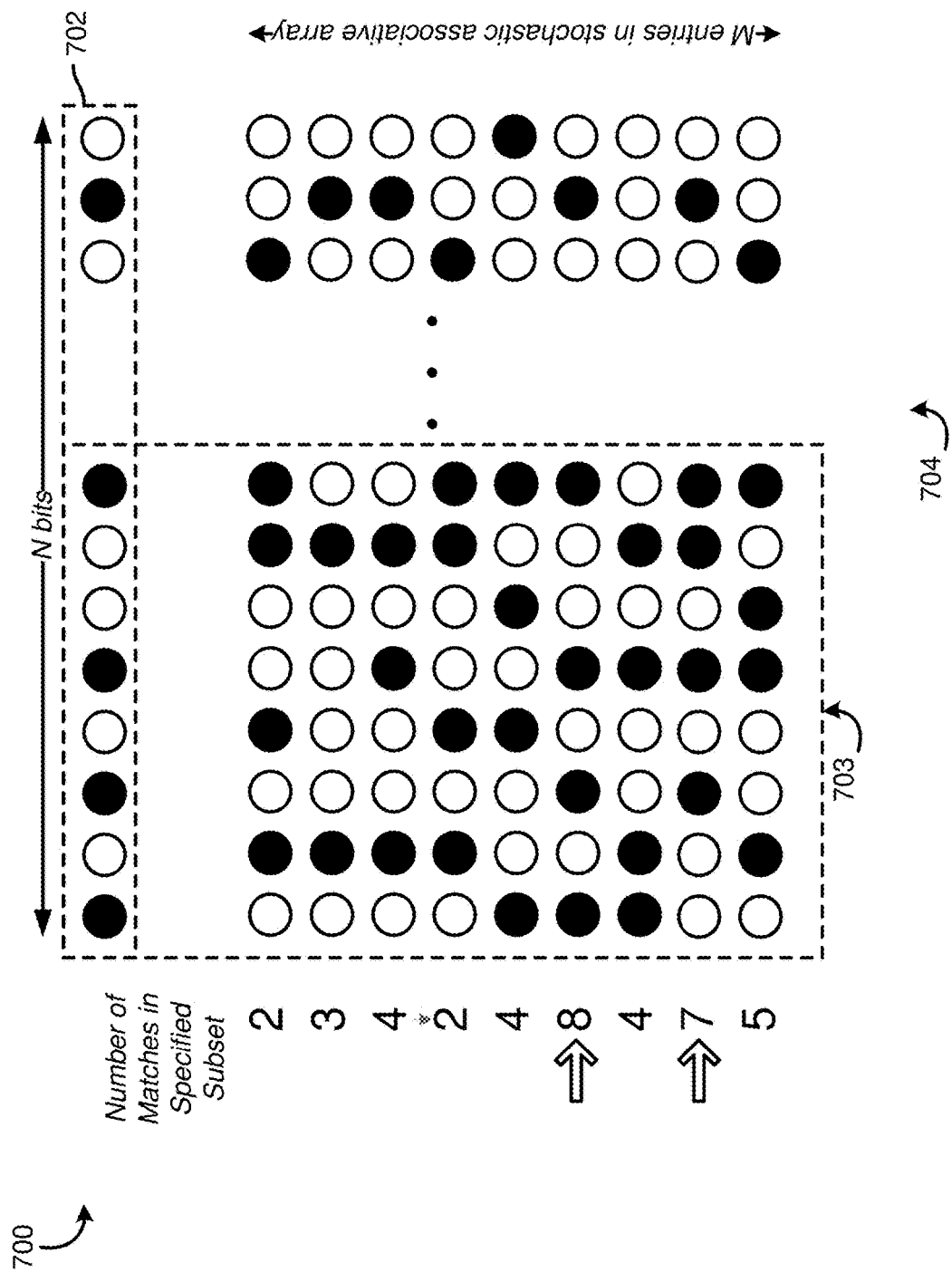

Referring now to FIG. 7, another conceptual diagram of an example 700 of performing a stochastic associative search on memory is shown. In this example 700, assume that data is distributed densely throughout a matrix 704. The example 700 may also apply to a situation in which the compute device 100 receives a request to search a specified subset 703 of columns in the matrix (e.g., a field search). Illustratively, a search key 702 expands to N bits, which is the same length of the rows in the matrix 704. The matrix 704 also includes M entries as part of a stochastic associative array.

The search key 702 is indicative of a reference data set having set bits in particular positions therein, represented in FIG. 7 as filled dots. In this example 700, the compute device 100 searches only the specified subset 703 of columns. Doing so reduces the amount of time spent by the compute device 100 performing a stochastic associative search operation on the data set because the compute device 100 does not evaluate every column of the matrix 704, in which N can correspond to a relatively large amount of columns (e.g., N can represent over 16,000 bits). Similar to the example 600, the compute device 100 may maintain a counter to associate with each row that is indicative of a number of matches in column indices associated with the row to the search key 702. In this case, the compute device 100 identifies, in the matrix 704, two matrices as candidate data sets (indicated by the one-way arrows pointing to the rows). The two candidate data sets are associated with eight matches and seven matches.

Referring back to FIG. 4, the compute device 100 (e.g., the memory controller 106) may perform a gather operation to read values from a set of columns defined in a template (e.g., a mask, such as a bitmap, indicative of columns to be accessed), as indicated in block 422. In doing so, and as indicated in block 424, the compute device 100 (e.g., the memory controller 106) may perform a gather operation from non-contiguous columns defined (e.g., identified) in the template (e.g., for the sparse data search of block 416). Subsequently, the method 400 advances to block 426 of FIG. 5, in which the compute device 100 (e.g., the memory controller 106) writes to the identified group of data sets concurrently to update the MANN 300 (e.g., the differentiable augmented memory 304, which may be embodied as the memory media 110).

Figure 5:
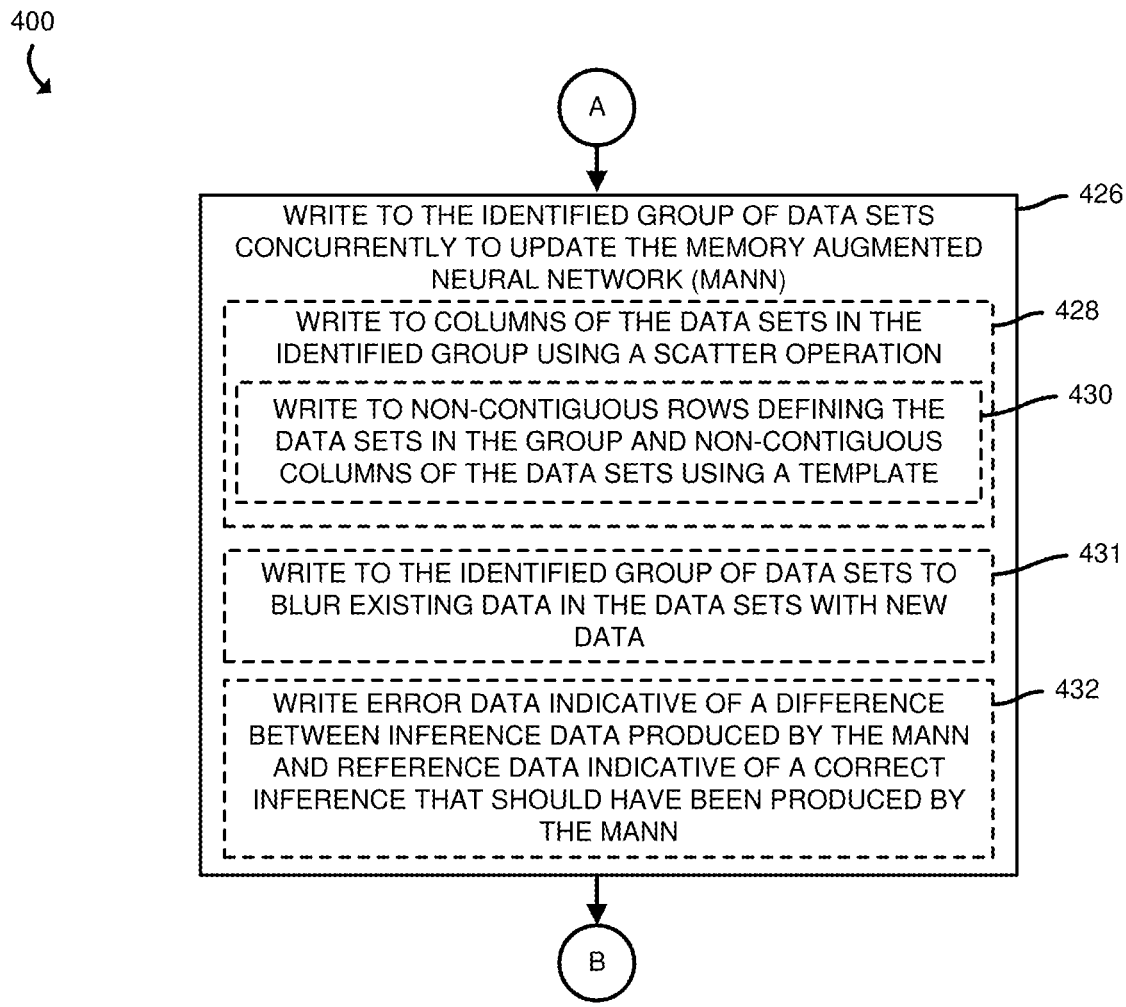

Referring now to FIG. 5, in writing to the identified group of data sets, the compute device 100 (e.g., the memory controller 106) may write to columns of the data sets in the identified group using a scatter operation, as indicated in block 428. In doing so, and as indicated in block 430, the compute device 100 (e.g., the memory controller 106) may write to non-contiguous rows, each defining a corresponding data set of the identified group, and, specifically, non-contiguous columns of those non-contiguous rows using a template.

Figures 8, 9, 10:
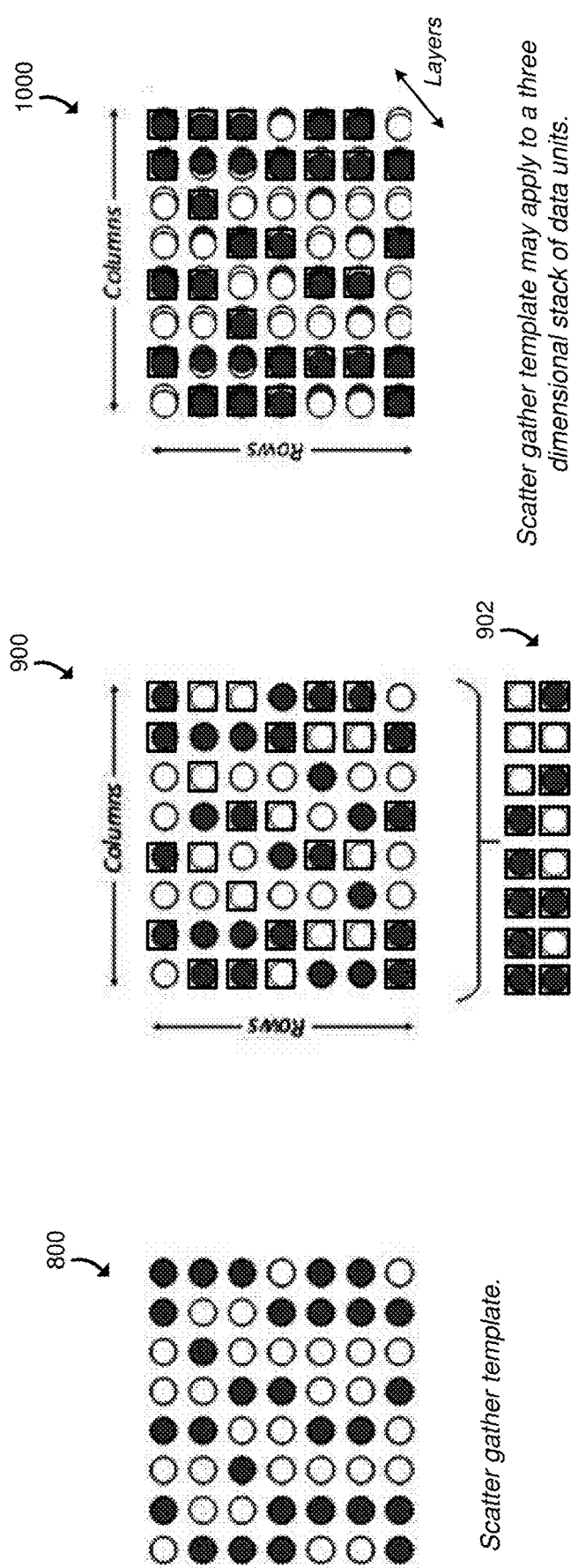
FIG. 8 is a simplified diagram of at least one embodiment of a template that may be used by the compute device of FIG. 1 for scatter-gather operations to update a memory augmented neural network (MANN)
FIG. 9 is a simplified diagram of a mapping of a contiguous data set to locations in a memory media of the compute device of FIG. 1 based on the template of FIG. 8.
FIG. 10 is a simplified diagram of the template of FIG. 8 applied to at least one embodiment of a memory media that has a three dimensional cross point architecture.

Referring briefly to FIG. 8, a template 800 may be embodied as a mask (e.g., a bitmap) in which, for a given location in the mask, if the value is a one, then the corresponding memory location should be accessed when using the template, and if the value is a zero, then the corresponding memory location should not be accessed when using the template, or vice versa. As an example, the template 800 is applied to available memory locations 900, shown in FIG. 9, in the memory media 110 to select a subset, shown with rectangular borders, to which an array 902 of data is to be written to (e.g., scattered to) to update the MANN 300. Referring to FIG. 10, in embodiments in which the memory media 110 has a three dimensional cross point architecture 1000, multiple data units (e.g., multiple bits) may be written to each column and row pair (e.g., one bit per layer). Referring back to FIG. 5, as indicated in block 431, in writing to the identified group of data sets, the compute device 100 (e.g., the memory controller 106) may blur existing data in each data set with new data (e.g., because the memory being written to is a soft memory, as described with reference to block 409 of FIG. 4). Additionally, and as indicated in block 432, in writing to the identified group of data sets, the compute device 100 may write error data indicative of a difference between inference data produced by the MANN 300 and reference data indicative of a correct inference that should have been produced by the MANN 300 (e.g., a difference between an incorrect determination of the identity of an object represented in an image and the actual, correct identity of the object represented in the image). Subsequently, the method 400 loops back to block 402 to determine whether to perform another efficient update to the MANN 300 (e.g., to write to one or more data sets matching a given key).

EXAMPLES

Illustrative examples of the technologies disclosed herein are provided below. An embodiment of the technologies may include any one or more, and any combination of, the examples described below.

Example 1 includes a device comprising circuitry to obtain a key usable to search a memory associated with a memory augmented neural network for one or more data sets; perform a stochastic associative search to identify a group of data sets within the memory that satisfy the key; and write to the identified group of data sets concurrently to update the memory augmented neural network.

Example 2 includes the subject matter of Example 1, and wherein to obtain a key usable to search a memory comprises to obtain a key usable to search a soft memory.

Example 3 includes the subject matter of any of Examples 1 and 2, and wherein to perform a stochastic associative search comprises to identify a data set that is indicative of multiple values that are blurred together.

Example 4 includes the subject matter of any of Examples 1-3, and wherein to identify a data set that is indicative of multiple values that are blurred together comprises to identify a data set in which indicative of a combination of one percentage of one value and another percentage of another value.

Example 5 includes the subject matter of any of Examples 1-4, and wherein to write to the identified group of data sets comprises to blur existing data in the data sets with new data.

Example 6 includes the subject matter of any of Examples 1-5, and wherein to obtain a key comprises to obtain a key that defines a reference data set to be searched for.

Example 7 includes the subject matter of any of Examples 1-6, and wherein to perform a stochastic associative search comprises to identify a predefined number of data sets having the lowest Hamming distance from the key.

Example 8 includes the subject matter of any of Examples 1-7, and wherein to identify a predefined number of data sets having the lowest Hamming distance comprises to identify a predefined number of data sets having the highest number of matching bits to a reference data set defined by the key.

Example 9 includes the subject matter of any of Examples 1-8, and wherein to perform a stochastic associative search comprises to perform the stochastic associative search based on a subset of a reference data set defined by the key.

Example 10 includes the subject matter of any of Examples 1-9, and wherein to perform the stochastic associative search comprises to perform a sparse data search to match values of bits in predefined columns of a reference data set defined by the key and the data sets within the memory.

Example 11 includes the subject matter of any of Examples 1-10, and wherein to perform the stochastic associative search comprises to perform a dense data search or a field search of data sets within the memory.

Example 12 includes the subject matter of any of Examples 1-11, and wherein to perform the stochastic associative search comprises to read values from a set of columns defined in a template.

Example 13 includes the subject matter of any of Examples 1-12, and wherein to read values from a set of columns defined in a template comprises to read values from a set of non-contiguous columns defined in a template.

Example 14 includes the subject matter of any of Examples 1-13, and wherein to write to the identified group of data sets comprises to write to columns of the data sets in the identified group using a scatter operation.

Example 15 includes the subject matter of any of Examples 1-14, and wherein to write to the identified group using a scatter operation comprises to write to non-contiguous rows defining the data sets of the identified group and non-contiguous columns of the data sets using a template.

Example 16 includes the subject matter of any of Examples 1-15, and wherein to write to the identified group of data sets comprises to write error data indicative of a difference between inference data produced by the memory augmented neural network and reference data.

Example 17 includes the subject matter of any of Examples 1-16, and wherein to perform a stochastic associative search comprises to perform a stochastic associative search on a memory having a cross point architecture.

Example 18 includes the subject matter of any of Examples 1-17, and wherein to perform a stochastic associative search comprises to perform a stochastic associative search on a memory having a three dimensional cross point architecture.

Example 19 includes a method comprising obtaining, by a device, a key usable to search a memory associated with a memory augmented neural network for one or more data sets; performing, by the device, a stochastic associative search to identify a group of data sets within the memory that satisfy the key; and writing, by the device, to the identified group of data sets concurrently to update the memory augmented neural network.

Example 20 includes one or more machine-readable storage media comprising a plurality of instructions stored thereon that, in response to being executed, cause a device to obtain a key usable to search a memory associated with a memory augmented neural network for one or more data sets; perform a stochastic associative search to identify a group of data sets within the memory that satisfy the key; and write to the identified group of data sets concurrently to update the memory augmented neural network.

The invention claimed is:

1. A device comprising:
   circuitry to:
      obtain a key usable to search a memory associated with a memory augmented neural network for one or more data sets;
      perform a stochastic associative search to identify a group of data sets within the memory that satisfy the key; and
      write to the identified group of data sets concurrently to update the memory augmented neural network,
      wherein to perform the stochastic associative search comprises to perform a sparse data search to match values of bits in a predefined portion of a reference data set defined by the key and the data sets within the memory.

2. The device of claim 1, wherein to obtain a key usable to search a memory comprises to obtain a key usable to search a soft memory.

3. The device of claim 1, wherein to perform a stochastic associative search comprises to identify a data set that is indicative of multiple values that are blurred together.

4. The device of claim 3, wherein to identify a data set that is indicative of multiple values that are blurred together comprises to identify a data set in which indicative of a combination of one percentage of one value and another percentage of another value.

5. The device of claim 1, wherein to write to the identified group of data sets comprises to blur existing data in the data sets with new data.

6. The device of claim 1, wherein to obtain a key comprises to obtain a key that defines the reference data set to be searched for.

7. The device of claim 1, wherein to perform a stochastic associative search comprises to identify a predefined number of data sets having a lowest Hamming distance from the key.

8. The device of claim 7, wherein to identify a predefined number of data sets having the lowest Hamming distance comprises to identify a predefined number of data sets having the highest number of matching bits to the reference data set defined by the key.

9. The device of claim 1, wherein to perform a stochastic associative search comprises to perform the stochastic associative search based on a subset of the reference data set defined by the key.

10. The device of claim 1, wherein the predefined portion comprises predefined columns of the reference data set defined by the key and the data sets within the memory.

11. The device of claim 1, wherein to perform the stochastic associative search comprises to perform a dense data search or a field search of data sets within the memory.

12. The device of claim 1, wherein to perform the stochastic associative search comprises to read values from a set of columns defined in a template.

13. The device of claim 12, wherein to read values from a set of columns defined in a template comprises to read values from a set of non-contiguous columns defined in a template.

14. The device of claim 1, wherein to write to the identified group of data sets comprises to write to columns of the data sets in the identified group using a scatter operation.

15. The device of claim 14, wherein to write to the identified group using a scatter operation comprises to write to non-contiguous rows defining the data sets of the identified group and non-contiguous columns of the data sets using a template.

16. The device of claim 1, wherein to write to the identified group of data sets comprises to write error data indicative of a difference between inference data produced by the memory augmented neural network and reference data.

17. The device of claim 1, wherein to perform a stochastic associative search comprises to perform a stochastic associative search on a memory having a cross point architecture.

18. The device of claim 1, wherein to perform a stochastic associative search comprises to perform a stochastic associative search on a memory having a three dimensional cross point architecture.

19. A method comprising:
   obtaining, by a device, a key usable to search a memory associated with a memory augmented neural network for one or more data sets;
   performing, by the device, a stochastic associative search to identify a group of data sets within the memory that satisfy the key; and
   writing, by the device, to the identified group of data sets concurrently to update the memory augmented neural network,
   wherein performing the stochastic associative search comprises performing a sparse data search to match values of bits in a predefined portion of a reference data set defined by the key and the data sets within the memory.

20. One or more non-transitory machine-readable storage media comprising a plurality of instructions stored thereon that, in response to being executed, cause a device to:
   obtain a key usable to search a memory associated with a memory augmented neural network for one or more data sets;
   perform a stochastic associative search to identify a group of data sets within the memory that satisfy the key; and write to the identified group of data sets concurrently to update the memory augmented neural network,
wherein to perform the stochastic associative search comprises to perform a sparse data search to match values of bits in a predefined portion of a reference data set defined by the key and the data sets within the memory.

\* \* \* \* \*